(12) United States Patent
King et al.

(10) Patent No.: US 10,053,634 B2
(45) Date of Patent: Aug. 21, 2018

(54) NITROGEN EXTRACTION FROM A GASEOUS CARBON DIOXIDE REACTANT STREAM

(71) Applicant: ECOKAP TECHNOLOGIES LLC, Miami, FL (US)

(72) Inventors: Paul E. King, Albany, OR (US); Jennifer Wilcox, Golden, CO (US)

(73) Assignee: ECOKAP TECHNOLOGIES LLC, Miami, FL (US)

( * ) Notice: Subject to any disclaimer, the term of this patent is extended or adjusted under 35 U.S.C. 154(b) by 0 days.

(21) Appl. No.: 15/638,385

(22) Filed: Jun. 30, 2017

(65) Prior Publication Data

US 2018/0127660 A1    May 10, 2018

Related U.S. Application Data

(60) Provisional application No. 62/356,728, filed on Jun. 30, 2016.

(51) Int. Cl.
    *C01B 32/50*    (2017.01)
    *C01B 3/38*    (2006.01)
    (Continued)

(52) U.S. Cl.
    CPC ............. *C10G 2/35* (2013.01); *B01D 53/228* (2013.01); *B01D 71/022* (2013.01); *C01B 3/12* (2013.01); *C01B 3/384* (2013.01); *C01B 21/02* (2013.01); *C01B 32/50* (2017.08); *C01C 1/04* (2013.01); *C10G 2/341* (2013.01); *C25B 1/04* (2013.01); *C01B 2203/0238* (2013.01); *C01B 2203/0283* (2013.01); *C01B 2203/062* (2013.01);
    (Continued)

(58) Field of Classification Search
    CPC ........... C01B 32/50; C01B 3/384; C01B 3/12; C01B 21/02; C01B 2203/062; C01B 2203/0238; C01B 2210/0051; C01B 2210/0046; C01B 2210/0012; C01B 2203/1241; C01B 2203/0855; C01B 2203/0283; C10G 2/35; C10G 2/341; C10G 2300/4006; C10G 2300/207; C10G 2300/202; C10G 2300/1022; C10G 2300/703; C25B 1/04; B01D 71/022; B01D 53/228
    See application file for complete search history.

(56) References Cited

U.S. PATENT DOCUMENTS

2008/0134895 A1* 6/2008 Ruud .................. B01D 53/228
                                                                                    96/9

\* cited by examiner

*Primary Examiner* — Jafar Parsa
(74) *Attorney, Agent, or Firm* — David S. Alavi (57) ABSTRACT

An input stream of gaseous nitrogen and carbon dioxide is introduced into a first interior volume of a separation vessel that is divided into first and second interior volumes by a separation membrane that includes a metal layer. The metal layer selectively permits movement of nitrogen through the metal layer. An output stream of gaseous nitrogen and carbon dioxide is conveyed out of the first interior volume and into a reaction vessel. The volume fraction of carbon dioxide is greater in the output stream than in the input stream; the volume fraction of nitrogen is reduced in the output stream relative to the input stream. Nitrogen is removed from the second interior volume to maintain a gradient of nitrogen partial pressure across the separation membrane that causes net transport of nitrogen from the first interior volume through the separation membrane into the second interior volume.

35 Claims, 6 Drawing Sheets

(51) Int. Cl.
*C01B 3/12* (2006.01)
*C01C 1/04* (2006.01)
*C10G 2/00* (2006.01)
*B01D 71/02* (2006.01)
*B01D 53/22* (2006.01)
*C25B 1/04* (2006.01)
*C01B 21/02* (2006.01)

(52) U.S. Cl.
CPC .................. *C01B 2203/0855* (2013.01); *C01B 2203/1241* (2013.01); *C01B 2210/0012* (2013.01); *C01B 2210/0046* (2013.01); *C01B 2210/0051* (2013.01); *C10G 2300/1022* (2013.01); *C10G 2300/202* (2013.01); *C10G 2300/207* (2013.01); *C10G 2300/4006* (2013.01); *C10G 2300/703* (2013.01)

NITROGEN EXTRACTION FROM A GASEOUS CARBON DIOXIDE REACTANT STREAM

BENEFIT CLAIMS TO RELATED APPLICATIONS

This application claims benefit of U.S. provisional App. No. 62/356,728 filed Jun. 30, 2016 in the names of Paul E. King and Jennifer Wilcox, said provisional application being hereby incorporated by reference as if fully set forth herein.

FIELD OF THE INVENTION

The field of the present invention relates to gaseous carbon dioxide reactant streams. In particular, methods are disclosed for extracting nitrogen from a gaseous carbon dioxide reactant stream.

SUMMARY

A gaseous input stream of a mixture of nitrogen and carbon dioxide is introduced into a first interior volume of a separation vessel. The separation vessel is divided into first and second interior volumes by a separation membrane that includes a metal layer. The metal layer selectively permits movement of nitrogen through the metal layer. A gaseous output stream of a mixture of nitrogen and carbon dioxide (i.e., a gaseous reduced-nitrogen carbon dioxide reactant stream) is conveyed out of the first interior volume of the separation vessel and into a reaction vessel. The volume fraction of carbon dioxide is greater in the output stream than in the input stream; the volume fraction of nitrogen is reduced in the output stream relative to the input stream. Nitrogen is removed from the second interior volume of the separation vessel so as to maintain a gradient of nitrogen partial pressure across the separation membrane that causes net transport of nitrogen from the first interior volume through the separation membrane into the second interior volume.

Objects and advantages pertaining to gaseous reduced-nitrogen carbon dioxide reactant streams may become apparent upon referring to the example embodiments illustrated in the drawings and disclosed in the following written description or appended claims.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The embodiments depicted are shown only schematically: all features may not be shown in full detail or in proper proportion, certain features or structures may be exaggerated relative to others for clarity, and the drawings should not be regarded as being to scale. The embodiments shown are only examples: they should not be construed as limiting the scope of the present disclosure or appended claims.

DETAILED DESCRIPTION OF EMBODIMENTS

Subject matter disclosed herein may be related to subject matter disclosed in one or more of: (i) U.S. provisional App. No. 62/202,768 entitled "Conversion of greenhouse gases by dry reforming" filed Aug. 7, 2015 in the names of Paul E. King and Ben Zion Livneh; (ii) U.S. provisional App. No. 62/202,770 entitled "Conversion of greenhouse gases to synthesis gas by dry reforming" filed Aug. 7, 2015 in the names of Paul E. King and Ben Zion Livneh; (iii) U.S. provisional App. No. 62/279,656 entitled "Microwave-assisted conversion of carbon dioxide to carbon monoxide" filed Jan. 15, 2016 in the names of Paul E. King and Ben Zion Livneh; (iv) U.S. provisional App. No. 62/249,891 entitled "Microwave irradiation of a chamber with time-varying microwave frequency" filed Nov. 2, 2015 in the name of Paul E. King; (v) U.S. non-provisional application Ser. No. 15/228,861 entitled "Conversion of greenhouse gases by dry reforming" filed Aug. 4, 2016 in the names of Paul E. King and Ben Zion Livneh (published May 11, 2017 as US 2017/0129777); (vi) U.S. non-provisional application Ser. No. 15/228,904 entitled "Conversion of greenhouse gases to synthesis gas by dry reforming" filed Aug. 4, 2016 in the names of Paul E. King and Ben Zion Livneh (published May 11, 2017 as US 2017/0129778); (vii) U.S. non-provisional application Ser. No. 15/403,127 entitled "Microwave-assisted conversion of carbon dioxide to carbon monoxide" filed Jan. 10, 2017 in the names of Paul E. King and Ben Zion Livneh; (viii) U.S. non-provisional application Ser. No. 15/292,100 entitled "Microwave irradiation of a chamber with time-varying microwave frequency" filed Oct. 12, 2016 in the name of Paul E. King; (ix) U.S. provisional App. No. 62/443,703 entitled "Conversion of greenhouse gases by dry reforming" filed Jan. 7, 2017 in the names of Paul E. King and Ben Zion Livneh; and (x) U.S. provisional App. No. 62/443,707 entitled "Conversion of greenhouse gases to synthesis gas by dry reforming" filed Jan. 7, 2017 in the names of Paul E. King and Ben Zion Livneh. Each one of said applications and publications is incorporated by reference as if fully set forth herein.

In various of the applications cited above, a gaseous reactant stream that includes carbon dioxide is introduced into a reaction vessel. In many instances the carbon dioxide reactant stream also includes molecular nitrogen. The nitrogen is inert and typically does not directly interfere with the desired reactions involving the carbon dioxide. However, the presence of nitrogen dilutes the effective concentration of carbon dioxide in the reactant stream, so in some instances it may be desirable to remove at least a portion of the nitrogen from the reactant stream. By removing at least a portion of the nitrogen, the effective concentration of carbon dioxide can be increased, which can in turn increase the rate or yield of a desired reaction involving carbon dioxide.

In many instances a desired reaction involving carbon dioxide requires an elevated temperature in the reaction vessel. The elevated temperature can be provided by any suitable conventional heating of the contents of the reaction vessel. Instead or in addition, microwave irradiation of the interior of the reaction vessel can be employed to elevate the temperature of the contents of the reaction vessel, as is the case in the applications cited above. In various examples, the microwaves deposit thermal energy in catalyst, microwave susceptor, or reactant material (typically solid material) within the reaction vessel; in some examples a single material can assume more than one of those roles. The presence of nitrogen can increase the power required to heat the reaction vessel contents to a temperature suitable for a desired reaction involving carbon dioxide, because some of the energy goes toward heating the nitrogen.

It therefore may be desirable in some instances to extract at least a portion of the nitrogen from a gaseous reactant stream of carbon dioxide and nitrogen before introducing the reactant stream into the reaction vessel. Inventive methods for achieving that purpose are disclosed herein.

Figure 1:
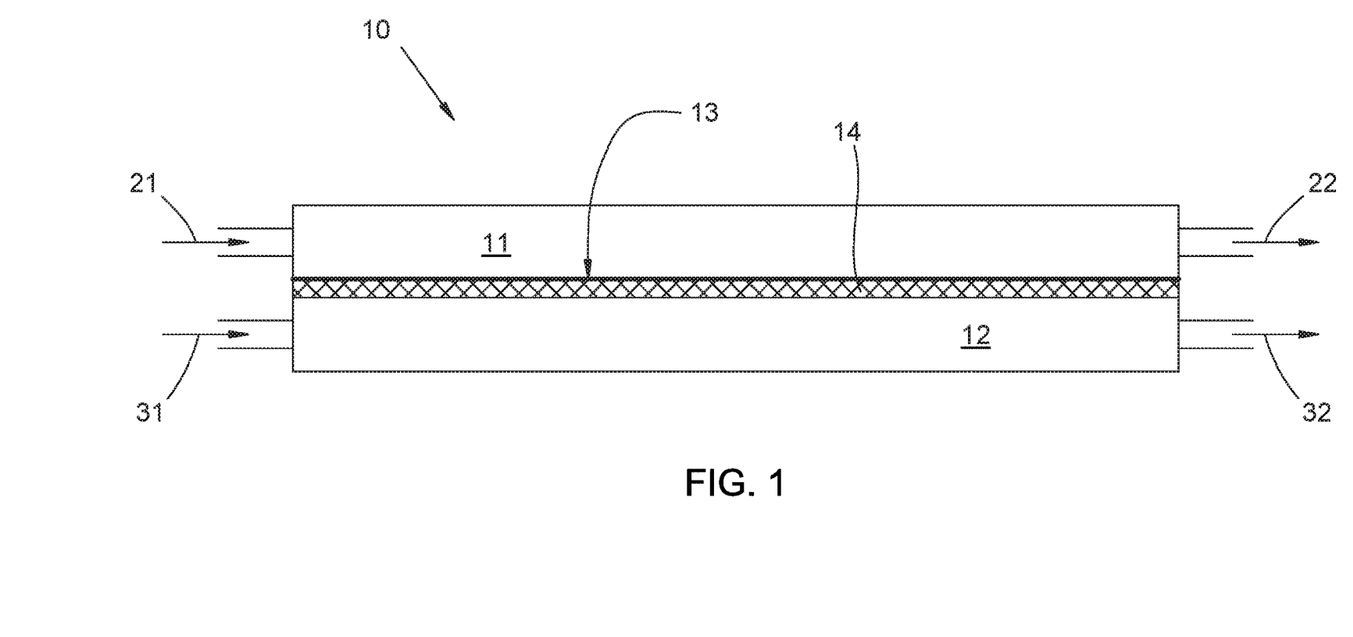
FIG. 1 is a schematic diagram of a separation vessel for producing a gaseous reduced-nitrogen carbon dioxide reactant stream.

A shown in FIG. 1, a gaseous input stream 21 of a mixture of nitrogen and carbon dioxide is introduced into a first interior volume 11 of a separation vessel 10. The input stream 21 is characterized by an input volume fraction of nitrogen and an input volume fraction of carbon dioxide. The separation vessel 10 is divided into the first interior volume 11 and a second interior volume 12 by a separation membrane that includes a metal layer 13 that selectively permits movement of nitrogen through the metal layer 13. A gaseous output stream 22 of a mixture of nitrogen and carbon dioxide (i.e., the gaseous reduced-nitrogen carbon dioxide reactant stream) exits the separation vessel 10 and is conveyed to a reaction vessel (described further below). The gaseous reduced-nitrogen carbon dioxide reactant stream 22 is characterized by an output volume fraction of nitrogen that is less than the input volume fraction of nitrogen and an output volume fraction of carbon dioxide that is greater than the input volume fraction of carbon dioxide. Nitrogen is removed from the second interior volume 12 of the separation vessel 10 so as to maintain a gradient of nitrogen partial pressure across the separation membrane that causes net transport of nitrogen from the first interior volume 11 through the separation membrane into the second interior volume 12.

The separation vessel 10 (or the contents thereof) can be heated in any suitable way so as to increase a net transport rate of nitrogen from the first interior volume 11 through the separation membrane into the second interior volume 12. In some examples, the separation vessel 10 is heated to greater than about 300° C., to greater than about 400° C., greater than about 500° C., or typically between about 400° C. and about 600° C. Pressure in the first interior volume 11 of the separation vessel 12 is greater than about 5 bar (i.e., can be as low as 5 bar), less than about 10 bar, less than about 50 bar, less than about 100 bar, or typically between about 50 bar and about 100 bar.

In some examples, the gaseous input stream comprises combustion exhaust. In some examples, the gaseous input stream comprises flue gas from an electrical or steam generation facility.

In some examples, (i) the input volume fraction of nitrogen is greater than about 60%, (ii) the output volume fraction of nitrogen is less than about 50%, (iii) the input volume fraction of carbon dioxide is less than about 20%, and (iv) the output volume fraction of carbon dioxide is greater than about 30%. In some examples the output volume fraction of carbon dioxide is greater than about 40%; in some examples the output volume fraction of carbon dioxide is greater than about 50%. In some examples, the input volume fraction of nitrogen can be about 78% or greater than about 80%. In some examples the output volume fraction of nitrogen can be less than about 40%, less than about 30%, less than about 20%, or less than about 10%.

In some examples the separation membrane comprises the metal layer 13 on a porous substrate 14; in some examples the porous substrate 14 is a ceramic substrate. In some examples the metal layer 13 is less than about 50 μm thick; in some examples the metal layer 13 is less than about 10 μm thick. Transport of nitrogen across the metal layer 13 has been observed to vary inversely with its thickness, so a thinner metal layer 13 can be advantageously employed. Defects in the metal layer 13 are preferably reduced or eliminated so as to maintain selectivity of the movement of nitrogen through the metal layer 13. In some examples the metal layer 13 comprises a foil layer attached to the substrate. In other examples the metal layer 13 is grown on the substrate by vapor deposition, by sputtering, or by other suitable one or more growth techniques.

Any one or more metals or alloys can be employed for forming the metal layer 13 that exhibits sufficiently rapid and selective movement of nitrogen through the metal layer 13. In some examples, the metal layer 13 comprises vanadium or an alloy of vanadium and iron. It is proposed that observed movement of nitrogen through vanadium or a vanadium/iron alloy proceeds by (i) adsorption of molecular nitrogen onto the surface of the metal layer 13, (ii) dissociation, catalyzed by the metal surface, of molecular nitrogen into atomic nitrogen, (iii) diffusion of the atomic nitrogen through the metal layer 13, and (iv) reaction of the atomic nitrogen at the second surface of the metal layer 13, by reforming molecular nitrogen or by reacting with a reactive component of a sweep gas 31 present in the second interior volume 12. However, any selective transport of nitrogen through the metal layer 13 shall fall within the scope of the present disclosure, regardless of the underlying mechanism.

Although the separation membrane (including the metal layer 13) is shown as being a simple flat surface in FIG. 1, any suitable shape or arrangement can be employed, e.g., for facilitating flow through the interior volumes 11 and 12 or for increasing the effective surface area of the metal layer 13 exposed to the interior volumes 11 or 12. Examples can include a substantially flat membrane as shown, a cylindrical membrane, a folded or convoluted membrane, and so forth.

To maintain the gradient of nitrogen partial pressure across the separation membrane that causes the net transport of nitrogen across the metal layer 13, nitrogen can be removed from the second interior volume 12 of the separation vessel in any suitable way. In one simple example, negative relative pressure can be applied (e.g., by applying suction or a vacuum pump) to the second interior volume 12 so as to pull nitrogen out of the second interior volume 12. In other examples, a sweep gas 31 can be introduced to flow through the second interior volume 12 of the separation vessel 10 so as to remove nitrogen from the second interior volume 12. In some such examples, the sweep gas 31 is substantially non-reactive with nitrogen, and the nitrogen is removed from the second interior volume 12 by being entrained in the flowing sweep gas in the gaseous flow 32 out of the second interior volume 12. In other such examples, the sweep gas 31 includes at least one component that is reactive with the nitrogen transported through the metal layer 13; the nitrogen is removed from the second interior volume 12 (or equivalently, prevented from entering the second interior volume 12) by reacting with the reactive component of the sweep gas 31 (at the surface of the metal layer 13 or within the second interior volume 12). The products of that reaction can exit the second interior volume 12 in the gaseous flow 32.

In some examples, the reactive component of the sweep gas 31 is hydrogen. The hydrogen is reactive with nitrogen transported through the metal layer 13, and the nitrogen is removed from the second interior volume 12 (or prevented from entering it) by reacting with the hydrogen to produce ammonia. The ammonia can exit the second interior volume 12 in the gaseous flow 32. The reaction of nitrogen and hydrogen to produce ammonia is a useful byproduct of the nitrogen reduction that yields the reduced-nitrogen carbon dioxide reactant stream 22. Useful levels of ammonia production have been observed at pressures in the second interior volume 12 of the separation vessel 10 between about 50 bar and about 100 bar, and at temperatures between about 400° C. and about 600° C. Pressures as low as 6 bar can be employed, or less than about 10 bar, less than about 50 bar, less than about 100 bar, or typically between about 50 bar and 100 bar. In contrast, the conventional Haber-Bosch process for ammonia production typically requires pressures of 150 to 250 bar.

Figure 2:
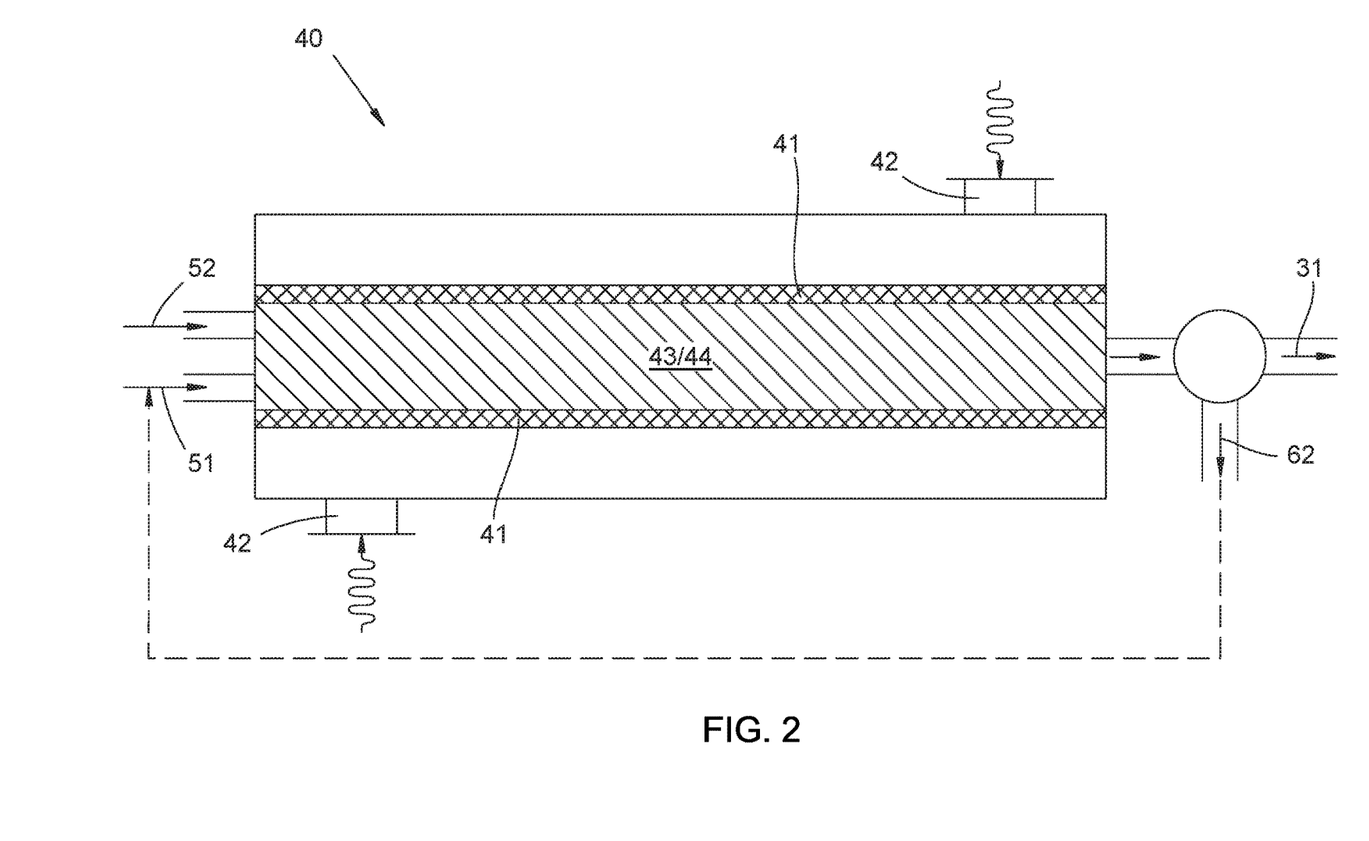
FIG. 2 is a schematic diagram of a vessel for producing gaseous hydrogen from a solid carbonaceous material and water using microwaves.

Hydrogen employed in the sweep gas 31 can be obtained from any suitable, desirable, or necessary source. In one example, hydrogen can simply be purchased in compressed or liquefied form as needed. In another example, the hydrogen can be generated by electrolysis, e.g., water electrolysis. In other examples (as in FIG. 2), the hydrogen for the sweep gas 31 can be generated by (i) a microwave-assisted reverse Boudouard reaction of a solid carbon source and carbon dioxide generating carbon monoxide, and (ii) a water-gas-shift reaction of carbon monoxide and water generating a gaseous mixture of carbon dioxide and the hydrogen as the sweep gas 31. In the example shown, a carbon dioxide stream 51 and a water stream 52 (typically steam) are introduced into a hydrogen-generation reaction vessel 40 that contains a solid carbonaceous material 43 and can also contain a solid catalyst or susceptor 44. In some examples the carbonaceous material 43 can act as a catalyst or susceptor or both, in addition to being a reactant; if one or more additional materials 44 are used, that material can act as catalyst, susceptor, or both. The streams 51 and 52 and the material 43 (and material 44 if present) are contained within microwave-transmitting chamber 41 within the reaction vessel 40. The material 43 (and material 44 if present) are irradiated with microwave energy through waveguides 42. The microwave energy favorably alters the kinetics of the reverse Boudouard reaction, which with microwave irradiation can proceed at about 600° C. The mixture of carbon dioxide and hydrogen can exit the reaction vessel 40 and be introduced into the second interior volume 12 of the separation vessel as the sweep gas 31. Alternatively, at least a portion of the carbon dioxide exiting the reaction vessel 40 can be separated from the hydrogen as the carbon dioxide stream 62. The hydrogen (and residual carbon dioxide, if any) are introduced into the second interior volume 12 as the sweep gas 31; if desired, the carbon dioxide stream 62 can be recycled into the carbon dioxide stream 51. Many of the techniques, variants, and process parameters disclosed in one or more of App. No. 62/279,656 or application Ser. No. 15/403,127 (each incorporated above) can be employed for hydrogen generation in the reaction vessel 40, and fall within the scope of the present disclosure.

In some examples, the input stream 21 includes other gases in addition to carbon dioxide and nitrogen. In some instances one or more of those additional gases must be reduced or removed from the input stream 21 (due to interference or incompatibility with the separation vessel 10 or its contents, e.g., the separation membrane or metal layer 13) or from the output stream 22 (due to interference or incompatibility with subsequent reactions involving the reduced-nitrogen carbon dioxide reactant stream 22). In some examples, including those in which the input stream includes combustion exhaust or flue gas, water is an additional gas present in the input stream 21 or the output stream 22 and must be reduced or removed from the input stream 21 or the output stream 22. In such examples, the methods disclosed herein can include dehumidifying the input stream 21 or the output stream 22 so that an output volume fraction of water in the output stream is less than about 3%. In either case, in some examples the water volume fraction of the output stream 22 can be less than about 2%, or less than about 1%. The dehumidification can be achieved using any suitable process or technique, including those disclosed in one or more of the provisional applications incorporated above.

Figure 3:
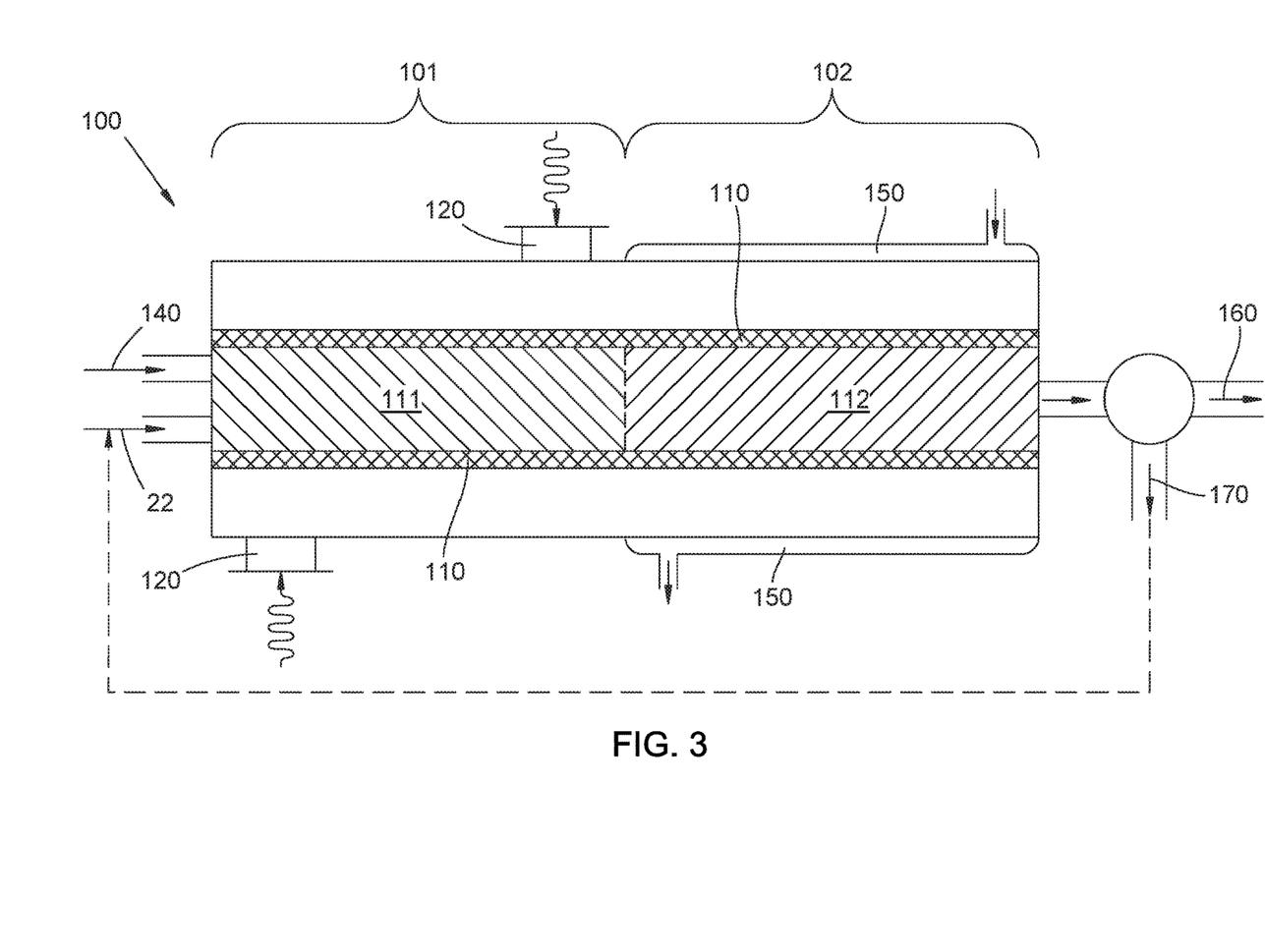
FIG. 3 is a schematic diagram of a gaseous reduced-nitrogen carbon dioxide reactant stream and a gaseous methane reactant stream entering a reaction vessel for forming one or more multiple-carbon reaction products using microwaves.

In the example of FIG. 3, the gaseous reduced-nitrogen carbon dioxide reactant stream 22 is introduced into a higher-temperature portion 101 of the reaction vessel 100 along with a dehumidified gaseous methane stream 140. A catalytic material 111 contained by the chamber 110 is irradiated with microwave energy through one or more waveguides 120 so as to heat the first catalytic material 111 (which also acts as a microwave susceptor; alternatively, an additional material can be included to act as a susceptor). The microwave irradiation thereby drives an endothermic reaction of the carbon dioxide of the reactant stream 21 and the methane from the stream 140, catalyzed by the first catalytic material 111, that produces hydrogen and carbon monoxide. A lower-temperature portion 102 of the reaction vessel 100 is cooled (e.g., using cooling water flowing through the water jacket 150), thereby establishing a temperature gradient within the reaction vessel 100. At least a portion of heat required to maintain the temperature gradient is supplied by the microwave energy irradiating the first catalytic material 111 in the higher-temperature portion 101 of the reaction vessel 100. The hydrogen and the carbon monoxide produced in the higher-temperature portion 101 flow into the lower-temperature portion 102. A second catalytic material 112 in the lower-temperature portion 102 of the reaction vessel 100 catalyzes exothermic reactions involving the carbon monoxide and the hydrogen to produce one or more multiple-carbon reaction products. A mixture that includes the one or more multiple-carbon reaction products flows out of the reaction vessel 100 from the lower-temperature portion 102. At least a portion of the one or more multiple-carbon reaction products are separated as product stream 160. If desired, at least a portion of unreacted or regenerated carbon dioxide can be separated as stream 170 and recycled into the reactant stream 22. Many of the techniques, variants, and process parameters disclosed in one or more of application Ser. No. 15/228,861, App. No. 62/202,768, or App. No. 62/443,703 (each incorporated above) can be employed for generating multiple-carbon reaction products in the reaction vessel 100, and fall within the scope of the present disclosure.

Figure 4:
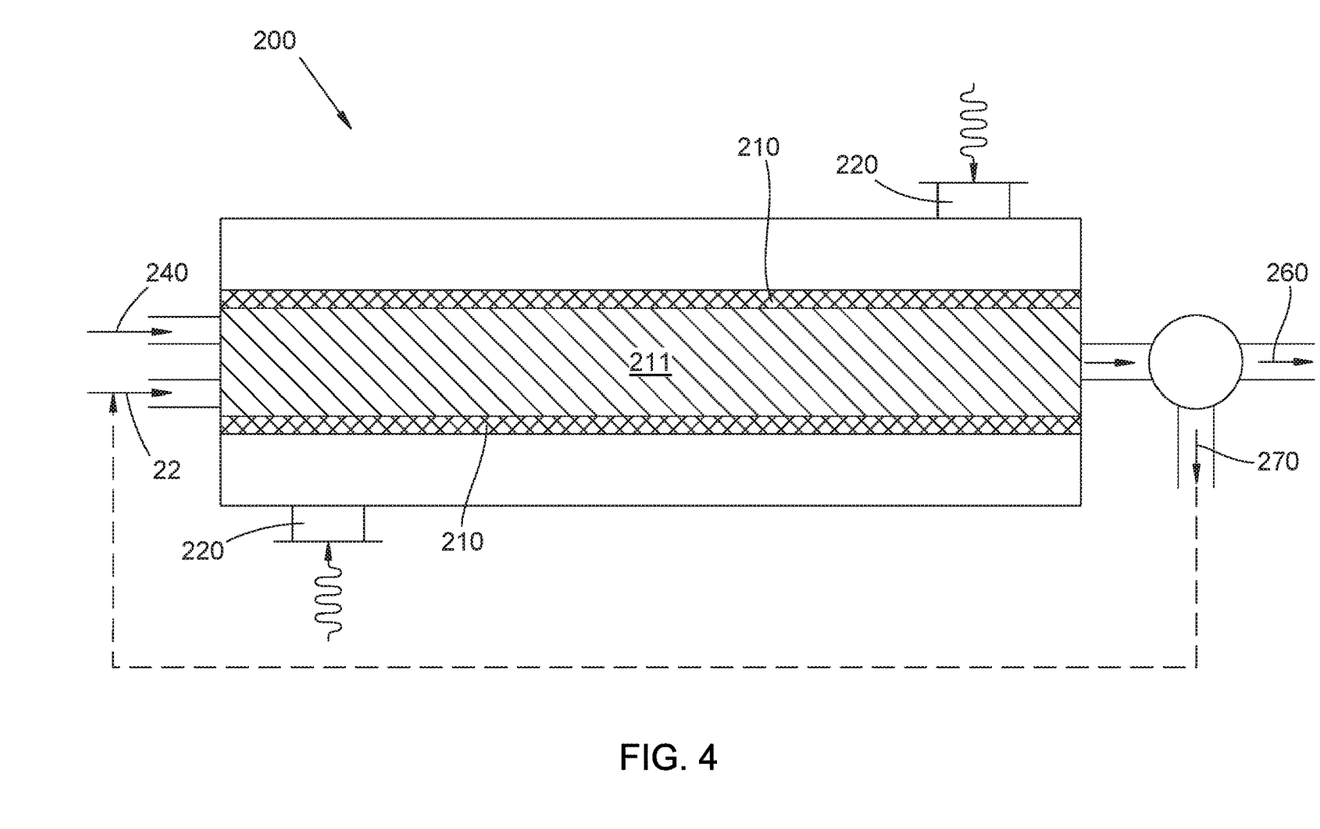
FIG. 4 is a schematic diagram of a gaseous reduced-nitrogen carbon dioxide reactant stream and a gaseous methane reactant stream entering a reaction vessel for forming carbon monoxide and hydrogen using microwaves.
Figure 5:
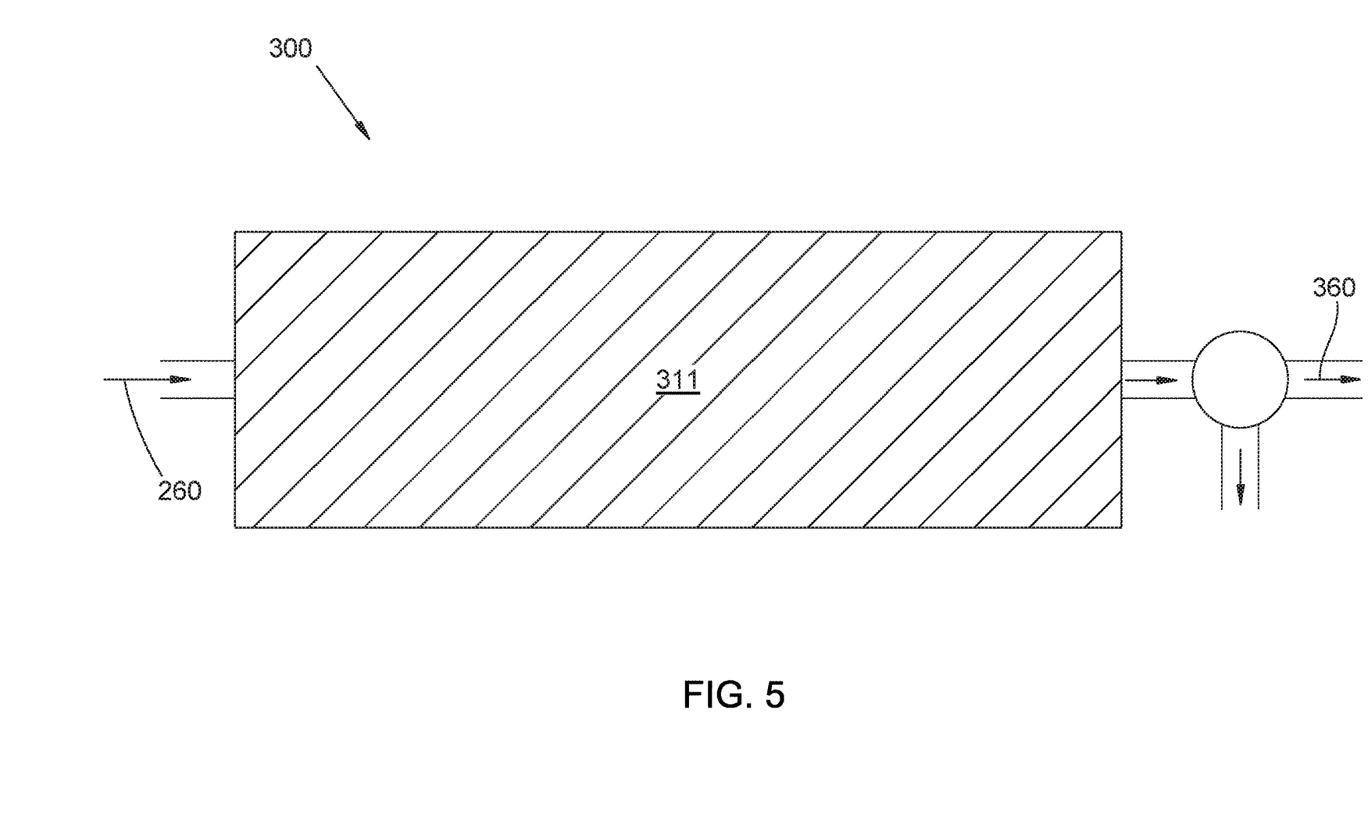
FIG. 5 is a schematic diagram of carbon monoxide and hydrogen produced in the reaction vessel of FIG. 4 entering a second reaction vessel for forming one or more multiple-carbon reaction products.

In the example of FIG. 4, the gaseous reduced-nitrogen carbon dioxide reactant stream 22 is introduced into a reaction vessel 200 along with a dehumidified gaseous methane stream 240. A catalytic material 211 contained by the chamber 210 is irradiated with microwave energy through one or more waveguides 220 so as to heat the catalytic material 211 (also acting as a susceptor; alternatively, an additional material can be included as a susceptor) and to drive an endothermic reaction of the carbon dioxide of the reactant stream 21 and the methane from the stream 240, catalyzed by the catalytic material 211, that produces hydrogen and carbon monoxide. At least a portion of heat required to maintain a temperature within the reaction vessel 200 is supplied by the microwave energy irradiating the catalytic material 211 in the reaction vessel 200. A mixture that includes the carbon monoxide and the hydrogen flows out of the reaction vessel 200. At least a portion of the carbon monoxide and the hydrogen from the mixture that leaves the reaction vessel 200 can be separated as product stream 260. If desired, at least a portion of unreacted or regenerated carbon dioxide can be separated as stream 270 and recycled into the reactant stream 22. If desired, at least a portion 260 of the mixture that leaves the reaction vessel 200 can be introduced into a second reaction vessel 300 containing a second catalytic material 311 (as in FIG. 5). The second catalytic 311 material in the second reaction vessel 300 catalyzes exothermic reactions involving the carbon monoxide and the hydrogen from the stream 260 to produce one or more multiple-carbon reaction products. At least a portion of those multiple-carbon reaction products can be separated as product stream 360. Many of the techniques, variants, and process parameters disclosed in one or more of application Ser. No. 15/228,904, App. No. 62/202,770, or App. No. 62/443,707 (each incorporated above) can be employed for generating hydrogen and carbon monoxide in the reaction vessel 200 or for generating the multiple-carbon reaction products in the reaction vessel 300, and fall within the scope of the present disclosure.

Figure 6:
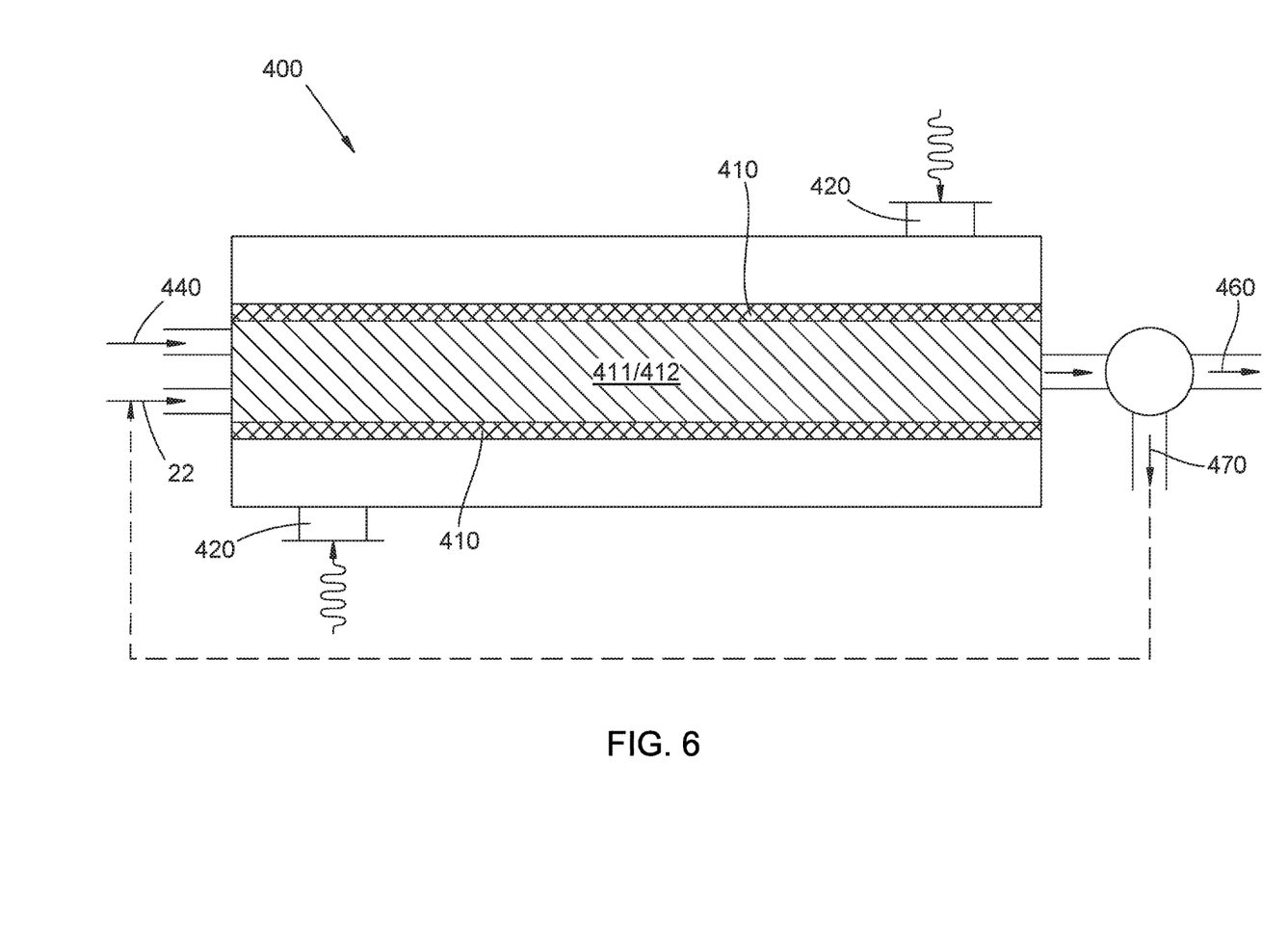
FIG. 6 is a schematic diagram of a gaseous reduced-nitrogen carbon dioxide reactant stream entering a reaction vessel containing a solid carbonaceous material for forming carbon monoxide using microwaves.

In the example of FIG. 6, the gaseous reduced-nitrogen carbon dioxide reactant stream 22 is introduced into a reaction vessel 400 that contains a dried solid carbonaceous material 411 within a chamber 410. The reaction vessel 400 can also contain a catalyst or susceptor 412, if needed or desired. In some examples the carbonaceous material 411 can act as a catalyst or susceptor or both, in addition to being a reactant; if one or more additional materials 412 are used, that material can act as catalyst, susceptor, or both. The catalytic material 411 (and material 412 if present) contained by the chamber 410 is irradiated with microwave energy through one or more waveguides 420 so as to heat the carbonaceous material 411 (and material 412 if present) and to drive an endothermic reaction of the carbon dioxide of the reactant stream 21 and the carbonaceous material 411 to produce carbon monoxide. At least a portion of heat required to maintain a temperature within the reaction vessel 400 is supplied by the microwave energy irradiating the carbonaceous material 411 (and material 412 if present) in the reaction vessel 400. A mixture that includes the carbon monoxide flows out of the reaction vessel 400. At least a portion of the carbon monoxide from the mixture that leaves the reaction vessel 400 can be separated as product stream 460. If desired, at least a portion of unreacted or regenerated carbon dioxide can be separated as stream 470 and recycled into the reactant stream 22. Many of the techniques, variants, and process parameters disclosed in one or more of App. No. 62/279,656 or application Ser. No. 15/403,127 (each incorporated above) can be employed for generating carbon monoxide in the reaction vessel 400, and fall within the scope of the present disclosure.

In any of the examples disclosed that include microwave irradiation of material within a reaction vessel, the methods and apparatus disclosed in one or more of App. No. 62/249,891 or application Ser. No. 15/292,100 (each incorporated above) can be employed in any suitable, desired, or necessary manner.

In addition to the preceding, the following examples fall within the scope of the present disclosure or appended claims:

Example 1

A method for generating a gaseous reduced-nitrogen carbon dioxide reactant stream, the method comprising: (a) introducing into a first interior volume of a separation vessel a gaseous input stream of a mixture of nitrogen and carbon dioxide, wherein the input stream is characterized by an input volume fraction of nitrogen and an input volume fraction of carbon dioxide, and wherein the separation vessel is divided into the first interior volume and a second interior volume by a separation membrane that includes a metal layer that selectively permits movement of nitrogen through the metal layer; (b) conveying, from the first interior volume of the separation vessel into a reaction vessel, a gaseous output stream of a mixture of nitrogen and carbon dioxide as the gaseous reduced-nitrogen carbon dioxide reactant stream, wherein the reactant stream is characterized by an output volume fraction of nitrogen that is less than the input volume fraction of nitrogen and an output volume fraction of carbon dioxide that is greater than the input volume fraction of carbon dioxide; and (c) removing nitrogen from the second interior volume of the separation vessel so as to maintain a gradient of nitrogen partial pressure across the separation membrane that causes net transport of nitrogen from the first interior volume through the separation membrane into the second interior volume.

Example 2

The method of Example 1 further comprising heating the separation vessel so as to increase a net transport rate of nitrogen from the first interior volume through the separation membrane into the second interior volume.

Example 3

The method of any one of Examples 1 or 2 wherein the separation vessel is heated to greater than about 300° C.

Example 4

The method of any one of Examples 1 through 3 wherein the separation vessel is heated to between about 400° C. and about 600° C.

Example 5

The method of any one of Examples 1 through 4 wherein pressure in the first interior volume of the separation vessel is greater than about 5 bar and less than about 10 bar, about 50 bar, or about 100 bar.

Example 6

The method of any one of Examples 1 through 4 wherein pressure in the first interior volume of the separation vessel is between about 50 bar and about 100 bar.

Example 7

The method of any one of Examples 1 through 6 wherein the gaseous input stream comprises combustion exhaust.

Example 8

The method of any one of Examples 1 through 7 wherein the gaseous input stream comprises flue gas from an electrical or steam generation facility.

Example 9

The method of any one of Examples 1 through 8 wherein (i) the input volume fraction of nitrogen is greater than about 60%, (ii) the output volume fraction of nitrogen is less than about 50%, (iii) the input volume fraction of carbon dioxide is less than about 20%, and (iv) the output volume fraction of carbon dioxide is greater than about 30%.

Example 10

The method of any one of Examples 1 through 9 wherein the output volume fraction of carbon dioxide is greater than about 40%.

Example 11

The method of any one of Examples 1 through 10 wherein the output volume fraction of carbon dioxide is greater than about 50%.

Example 12

The method of any one of Examples 1 through 11 wherein the input volume fraction of nitrogen is greater than about 80%.

Example 13

The method of any one of Examples 1 through 12 wherein removing the nitrogen includes applying negative relative pressure to the second interior volume of the separation vessel so as to pull nitrogen out of the second interior volume.

Example 14

The method of any one of Examples 1 through 12 further comprising flowing a sweep gas through the second interior volume of the separation vessel so as to remove nitrogen from the second interior volume, wherein the sweep gas is substantially non-reactive with nitrogen and the nitrogen is removed from the second interior volume by being entrained in the flowing sweep gas.

Example 15

The method of any one of Examples 1 through 12 further comprising flowing a sweep gas through the second interior volume of the separation vessel so as to remove nitrogen from the second interior volume, wherein the sweep gas includes at least one component that is reactive with nitrogen transported through the metal layer and the nitrogen is removed from the second interior volume by reacting with the reactive component of the sweep gas.

Example 16

The method of any one of Examples 1 through 12 further comprising flowing a sweep gas through the second interior volume of the separation vessel so as to remove nitrogen from the second interior volume, wherein the sweep gas includes hydrogen that is reactive with nitrogen transported through the metal layer and the nitrogen is removed from the second interior volume by reacting with the hydrogen to produce ammonia.

Example 17

The method of Example 16 wherein hydrogen partial pressure in the second interior volume of the separation vessel is between about 50 bar and about 100 bar, and the separation vessel is heated to between about 400° C. and about 600° C.

Example 18

The method of Example 16 wherein hydrogen partial pressure in the second interior volume of the separation vessel is between about 5 bar and about 50 bar, and the separation vessel is heated to between about 400° C. and about 600° C.

Example 19

The method of any one of Examples 16 through 18 further comprising generating the hydrogen by electrolysis.

Example 20

The method of any one of Examples 16 through 18 further comprising generating the hydrogen by (i) a microwave-assisted reverse Boudouard reaction of a solid carbon source and carbon dioxide generating carbon monoxide, and (ii) a water-gas-shift reaction of carbon monoxide and water generating a gaseous mixture of carbon dioxide and the hydrogen as the sweep gas.

Example 21

The method of Example 20 including any one or more apparatus, methods, variations, or parameters disclosed one or more of App. Nos.: 62/279,656; Ser. Nos. 15/403,127; 62/249,891; or Ser. No. 15/292,100.

Example 22

The method of any one of Examples 1 through 21 wherein the separation membrane comprises the metal layer on a porous substrate.

Example 23

The method of Example 22 wherein the porous substrate is a ceramic substrate.

Example 24

The method of any one of Examples 1 through 23 wherein the metal layer is less than about 50 µm thick.

Example 25

The method of any one of Examples 1 through 24 wherein the metal layer is less than about 10 µm thick.

Example 26

The method of any one of Examples 1 through 25 wherein the metal layer comprises a foil layer attached to a substrate.

Example 27

The method of any one of Examples 1 through 26 wherein the metal layer is grown on a substrate by vapor deposition or by sputtering.

Example 28

The method of any one of Examples 1 through 27 wherein the metal layer comprises vanadium or an alloy of vanadium and iron.

Example 29

The method of any one of Examples 1 through 28 further comprising: (i) dehumidifying the input stream so that an output volume fraction of water in the output stream is less than about 3%, less than about 2%, or less than about 1%, or (ii) dehumidifying the output stream so that the output volume fraction of water in the output stream is less than about 3%, less than about 2%, or less than about 1%.

Example 30

The method of Example 29 wherein the reactant stream is conveyed into a higher-temperature portion of the reaction vessel, the method further comprising: (A) introducing a flow of a dehumidified gaseous source of methane into the higher-temperature portion of the reaction vessel with the reactant stream; (B) irradiating first catalytic material in the higher-temperature portion of the reaction vessel with microwave energy so as to heat the first catalytic material and drive an endothermic reaction of the carbon dioxide of the reactant stream and the methane, catalyzed by the first catalytic material, that produces hydrogen and carbon monoxide; (C) cooling a lower-temperature portion of the reaction vessel, thereby establishing a temperature gradient within the reaction vessel wherein the irradiated, higher-temperature portion of the reaction vessel exhibits a higher temperature than the cooled, lower-temperature portion of the reaction vessel, wherein at least a portion of heat required to maintain the temperature gradient is supplied by the microwave energy irradiating the first catalytic material in the higher-temperature portion of the reaction vessel; (D) allowing the hydrogen and the carbon monoxide produced to flow from the higher-temperature portion of the reaction vessel into the lower-temperature portion of the reaction vessel, wherein second catalytic material in the lower-temperature portion of the reaction vessel catalyzes exothermic reactions involving the carbon monoxide and the hydrogen to produce one or more multiple-carbon reaction products; (E) allowing a mixture that includes the one or more multiple-carbon reaction products to flow out of the reaction vessel from the lower-temperature portion thereof; and (F) separating at least a portion of the one or more multiple-carbon reaction products from the mixture that leaves the reaction vessel.

Example 31

The method of Example 30 including any one or more apparatus, methods, variations, or parameters disclosed in one or more of App. Nos.: Ser. Nos. 15/228,861; 62/202,768; 62/443,703; 62/249,891; or Ser. No. 15/292,100.

Example 32

The method of Example 29 further comprising: (A) introducing a flow of a dehumidified gaseous source of methane into the reaction vessel with the reactant stream; (B) irradiating catalytic material in the reaction vessel with microwave energy so as to heat the catalytic material and drive an endothermic reaction of the carbon dioxide of the reactant stream and the methane, catalyzed by the catalytic material, that produces hydrogen and carbon monoxide, wherein at least a portion of heat required to maintain a temperature within the reaction vessel is supplied by the microwave energy irradiating the catalytic material in the reaction vessel; and (C) allowing a mixture that includes the carbon monoxide and the hydrogen to flow out of the reaction vessel.

Example 33

The method of Example 32 further comprising separating at least a portion of the carbon monoxide and the hydrogen from the mixture that leaves the reaction vessel.

Example 34

The method of any one of Examples 32 or 33 further comprising introducing at least a portion of the mixture that leaves the reaction vessel into a second reaction vessel containing a second catalytic material, wherein the second catalytic material in the second reaction vessel catalyzes exothermic reactions involving the carbon monoxide and the hydrogen to produce one or more multiple-carbon reaction products.

Example 35

The method of Example 30 including any one or more apparatus, methods, variations, or parameters disclosed in one or more of App. Nos.: Ser. Nos. 15/228,904; 62/202,770; 62/443,707; 62/249,891; or Ser. No. 15/292,100.

Example 36

The method of Example 29 further comprising: (A) irradiating dried, solid carbonaceous material in the reaction vessel with microwave energy so as to heat the solid carbonaceous materials and drive an endothermic reaction of the carbon dioxide of the reactant stream and carbon that produces carbon monoxide, wherein at least a portion of heat required to maintain a temperature within the reaction vessel is supplied by the microwave energy irradiating the carbonaceous material in the reaction vessel; and (B) allowing the generated carbon monoxide to flow out of the reaction vessel.

Example 37

The method of Example 36 wherein (i) solid susceptor or catalytic material is mixed with the solid carbonaceous material, and (ii) the method further comprises irradiating the solid susceptor or catalytic material along with the carbonaceous material.

Example 38

The method of any one of Examples 36 or 37 further comprising separating at least a portion of the generated carbon monoxide from a mixture that flows out of the reaction vessel.

Example 39

The method of any one of Examples 36 through 38 including any one or more apparatus, methods, variations, or parameters disclosed one or more of App. Nos.: 62/279,656; Ser. Nos. 15/403,127; 62/249,891; or Ser. No. 15/292,100.

It is intended that equivalents of the disclosed example embodiments and methods shall fall within the scope of the present disclosure or appended claims. It is intended that the disclosed example embodiments and methods, and equivalents thereof, may be modified while remaining within the scope of the present disclosure or appended claims.

In the foregoing Detailed Description, various features may be grouped together in several example embodiments for the purpose of streamlining the disclosure. This method of disclosure is not to be interpreted as reflecting an intention that any claimed embodiment requires more features than are expressly recited in the corresponding claim. Rather, as the appended claims reflect, inventive subject matter may lie in less than all features of a single disclosed example embodiment. Thus, the appended claims are hereby incorporated into the Detailed Description, with each claim standing on its own as a separate disclosed embodiment. However, the present disclosure shall also be construed as implicitly disclosing any embodiment having any suitable set of one or more disclosed or claimed features (i.e., a set of features that are neither incompatible nor mutually exclusive) that appear in the present disclosure or the appended claims, including those sets that may not be explicitly disclosed herein. In addition, for purposes of disclosure, each of the appended dependent claims shall be construed as if written in multiple dependent form and dependent upon all preceding claims with which it is not inconsistent. It should be further noted that the scope of the appended claims does not necessarily encompass the whole of the subject matter disclosed herein.

For purposes of the present disclosure and appended claims, the conjunction "or" is to be construed inclusively (e.g., "a dog or a cat" would be interpreted as "a dog, or a cat, or both"; e.g., "a dog, a cat, or a mouse" would be interpreted as "a dog, or a cat, or a mouse, or any two, or all three"), unless: (i) it is explicitly stated otherwise, e.g., by use of "either . . . or," "only one of," or similar language; or (ii) two or more of the listed alternatives are mutually exclusive within the particular context, in which case "or" would encompass only those combinations involving non-mutually-exclusive alternatives. For purposes of the present disclosure and appended claims, the words "comprising," "including," "having," and variants thereof, wherever they appear, shall be construed as open ended terminology, with the same meaning as if the phrase "at least" were appended after each instance thereof, unless explicitly stated otherwise. For purposes of the present disclosure or appended claims, when terms are employed such as "about equal to," "substantially equal to," "greater than about," "less than about," and so forth, in relation to a numerical quantity, standard conventions pertaining to measurement precision and significant digits shall apply, unless a differing interpretation is explicitly set forth. For null quantities described by phrases such as "substantially prevented," "substantially absent," "substantially eliminated," "about equal to zero," "negligible," and so forth, each such phrase shall denote the case wherein the quantity in question has been reduced or diminished to such an extent that, for practical purposes in the context of the intended operation or use of the disclosed or claimed apparatus or method, the overall behavior or performance of the apparatus or method does not differ from that which would have occurred had the null quantity in fact been completely removed, exactly equal to zero, or otherwise exactly nulled.

In the appended claims, any labelling of elements, steps, limitations, or other portions of a claim (e.g., first, second, etc., (a), (b), (c), etc., or (i), (ii), (iii), etc.) is only for purposes of clarity, and shall not be construed as implying any sort of ordering or precedence of the claim portions so labelled. If any such ordering or precedence is intended, it will be explicitly recited in the claim or, in some instances, it will be implicit or inherent based on the specific content of the claim. In the appended claims, if the provisions of 35 USC § 112(f) are desired to be invoked in an apparatus claim, then the word "means" will appear in that apparatus claim. If those provisions are desired to be invoked in a method claim, the words "a step for" will appear in that method claim. Conversely, if the words "means" or "a step for" do not appear in a claim, then the provisions of 35 USC § 112(f) are not intended to be invoked for that claim.

If any one or more disclosures are incorporated herein by reference and such incorporated disclosures conflict in part or whole with, or differ in scope from, the present disclosure, then to the extent of conflict, broader disclosure, or broader definition of terms, the present disclosure controls. If such incorporated disclosures conflict in part or whole with one another, then to the extent of conflict, the later-dated disclosure controls.

The Abstract is provided as required as an aid to those searching for specific subject matter within the patent literature. However, the Abstract is not intended to imply that any elements, features, or limitations recited therein are necessarily encompassed by any particular claim. The scope of subject matter encompassed by each claim shall be determined by the recitation of only that claim.

What is claimed is:

1. A method for generating a gaseous reduced-nitrogen carbon dioxide reactant stream, the method comprising:
   (a) introducing into a first interior volume of a separation vessel a gaseous input stream of a mixture of nitrogen and carbon dioxide, wherein the input stream is characterized by an input volume fraction of nitrogen and an input volume fraction of carbon dioxide, and wherein the separation vessel is divided into the first interior volume and a second interior volume by a separation membrane that includes a metal layer that selectively permits movement of nitrogen through the metal layer;
   (b) conveying, from the first interior volume of the separation vessel into a reaction vessel, a gaseous output stream of a mixture of nitrogen and carbon dioxide as the gaseous reduced-nitrogen carbon dioxide reactant stream, wherein the reactant stream is characterized by an output volume fraction of nitrogen that is less than the input volume fraction of nitrogen and an output volume fraction of carbon dioxide that is greater than the input volume fraction of carbon dioxide; and (c) removing nitrogen from the second interior volume of the separation vessel so as to maintain a gradient of nitrogen partial pressure across the separation membrane that causes net transport of nitrogen from the first interior volume through the separation membrane into the second interior volume.

2. The method of claim 1 further comprising heating the separation vessel so as to increase a net transport rate of nitrogen from the first interior volume through the separation membrane into the second interior volume.

3. The method of claim 2 wherein the separation vessel is heated to greater than about 300° C.

4. The method of claim 2 wherein the separation vessel is heated to between about 400° C. and about 600° C.

5. The method of claim 1 wherein pressure in the first interior volume of the separation vessel is between about 5 bar and about 50 bar.

6. The method of claim 1 wherein pressure in the first interior volume of the separation vessel is between about 50 bar and about 100 bar.

7. The method of claim 1 wherein the gaseous input stream comprises combustion exhaust.

8. The method of claim 1 wherein the gaseous input stream comprises flue gas from an electrical or steam generation facility.

9. The method of claim 1 wherein (i) the input volume fraction of nitrogen is greater than about 60%, (ii) the output volume fraction of nitrogen is less than about 50%, (iii) the input volume fraction of carbon dioxide is less than about 20%, and (iv) the output volume fraction of carbon dioxide is greater than about 30%.

10. The method of claim 9 wherein the output volume fraction of carbon dioxide is greater than about 40%.

11. The method of claim 9 wherein the output volume fraction of carbon dioxide is greater than about 50%.

12. The method of claim 9 wherein the input volume fraction of nitrogen is greater than about 80%.

13. The method of claim 1 wherein removing the nitrogen includes applying negative relative pressure to the second interior volume of the separation vessel so as to pull nitrogen out of the second interior volume.

14. The method of claim 1 further comprising flowing a sweep gas through the second interior volume of the separation vessel so as to remove nitrogen from the second interior volume, wherein the sweep gas is substantially non-reactive with nitrogen and the nitrogen is removed from the second interior volume by being entrained in the flowing sweep gas.

15. The method of claim 1 further comprising flowing a sweep gas through the second interior volume of the separation vessel so as to remove nitrogen from the second interior volume, wherein the sweep gas includes at least one component that is reactive with nitrogen transported through the metal layer and the nitrogen is removed from the second interior volume by reacting with the reactive component of the sweep gas.

16. The method of claim 1 further comprising flowing a sweep gas through the second interior volume of the separation vessel so as to remove nitrogen from the second interior volume, wherein the sweep gas includes hydrogen that is reactive with nitrogen transported through the metal layer and the nitrogen is removed from the second interior volume by reacting with the hydrogen to produce ammonia.

17. The method of claim 16 wherein hydrogen partial pressure in the second interior volume of the separation vessel is between about 50 bar and about 100 bar, and the separation vessel is heated to between about 400° C. and about 600° C.

18. The method of claim 16 wherein hydrogen partial pressure in the second interior volume of the separation vessel is between about 5 bar and about 50 bar, and the separation vessel is heated to between about 400° C. and about 600° C.

19. The method of claim 16 further comprising generating the hydrogen by electrolysis.

20. The method of claim 16 further comprising generating in the hydrogen by (i) a microwave-assisted reverse Boudouard reaction of a solid carbon source and carbon dioxide generating carbon monoxide, and (ii) a water-gas-shift reaction of carbon monoxide and water generating a gaseous mixture of carbon dioxide and the hydrogen as the sweep gas.

21. The method of claim 1 wherein the separation membrane comprises the metal layer on a porous substrate.

22. The method of claim 21 wherein the porous substrate is a ceramic substrate.

23. The method of claim 21 wherein the metal layer is less than about 50 µm thick.

24. The method of claim 21 wherein the metal layer is less than about 10 µm thick.

25. The method of claim 21 wherein the metal layer comprises a foil layer attached to the substrate.

26. The method of claim 21 wherein the metal layer is grown on the substrate by vapor deposition or by sputtering.

27. The method of claim 1 wherein the metal layer comprises vanadium or an alloy of vanadium and iron.

28. The method of claim 1 further comprising: (i) dehumidifying the input stream so that an output volume fraction of water in the output stream is less than about 3%, or (ii) dehumidifying the output stream so that the output volume fraction of water in the output stream is less than about 3%.

29. The method of claim 28 wherein the reactant stream is conveyed into a higher-temperature portion of the reaction vessel, the method further comprising:

(A) introducing a flow of a dehumidified gaseous source of methane into the higher-temperature portion of the reaction vessel with the reactant stream;

(B) irradiating first catalytic material in the higher-temperature portion of the reaction vessel with microwave energy so as to heat the first catalytic material and drive an endothermic reaction of the carbon dioxide of the reactant stream and the methane, catalyzed by the first catalytic material, that produces hydrogen and carbon monoxide;

(C) cooling a lower-temperature portion of the reaction vessel, thereby establishing a temperature gradient within the reaction vessel wherein the irradiated, higher-temperature portion of the reaction vessel exhibits a higher temperature than the cooled, lower-temperature portion of the reaction vessel, wherein at least a portion of heat required to maintain the temperature gradient is supplied by the microwave energy irradiating the first catalytic material in the higher-temperature portion of the reaction vessel;

(D) allowing the hydrogen and the carbon monoxide produced to flow from the higher-temperature portion of the reaction vessel into the lower-temperature portion of the reaction vessel, wherein second catalytic material in the lower-temperature portion of the reaction vessel catalyzes exothermic reactions involving the carbon monoxide and the hydrogen to produce one or more multiple-carbon reaction products;

(E) allowing a mixture that includes the one or more multiple-carbon reaction products to flow out of the reaction vessel from the lower-temperature portion thereof; and (F) separating at least a portion of the one or more multiple-carbon reaction products from the mixture that leaves the reaction vessel.

30. The method of claim 28 further comprising:

(A) introducing a flow of a dehumidified gaseous source of methane into the reaction vessel with the reactant stream;

(B) irradiating catalytic material in the reaction vessel with microwave energy so as to heat the catalytic material and drive an endothermic reaction of the carbon dioxide of the reactant stream and the methane, catalyzed by the catalytic material, that produces hydrogen and carbon monoxide, wherein at least a portion of heat required to maintain a temperature within the reaction vessel is supplied by the microwave energy irradiating the catalytic material in the reaction vessel; and (C) allowing a mixture that includes the carbon monoxide and the hydrogen to flow out of the reaction vessel.

31. The method of claim 30 further comprising separating at least a portion of the carbon monoxide and the hydrogen from the mixture that leaves the reaction vessel.

32. The method of claim 30 further comprising introducing at least a portion of the mixture that leaves the reaction vessel into a second reaction vessel containing a second catalytic material, wherein the second catalytic material in the second reaction vessel catalyzes exothermic reactions involving the carbon monoxide and the hydrogen to produce one or more multiple-carbon reaction products.

33. The method of claim 28 further comprising:

(A) irradiating dried, solid carbonaceous material in the reaction vessel with microwave energy so as to heat the solid carbonaceous materials and drive an endothermic reaction of the carbon dioxide of the reactant stream and carbon that produces carbon monoxide, wherein at least a portion of heat required to maintain a temperature within the reaction vessel is supplied by the microwave energy irradiating the carbonaceous material in the reaction vessel; and (B) allowing the generated carbon monoxide to flow out of the reaction vessel.

34. The method of claim 33 wherein (i) solid susceptor or catalytic material is mixed with the solid carbonaceous material, and (ii) the method further comprises irradiating the solid susceptor or catalytic material along with the carbonaceous material.

35. The method of claim 33 further comprising separating at least a portion of the generated carbon monoxide from a mixture that flows out of the reaction vessel.

* * * * *